United States Patent [19]

Hirsch

[11] 4,349,213

[45] Sep. 14, 1982

[54] FIREWOOD RACK AND CARRIER

[76] Inventor: Ronald W. Hirsch, 208 Ellis St., Haddonfield, N.J. 08033

[21] Appl. No.: 151,086

[22] Filed: May 19, 1980

[51] Int. Cl.³ .............................................. B62B 1/00
[52] U.S. Cl. .................................. 280/638; 126/283; 211/182; 211/186; 211/189; 280/47.35; 280/79.3
[58] Field of Search ............ 126/283; 280/79.3, 47.34, 280/47.35, 639, 638, 35, 47.19, 47.24, 659, 12 E; 211/182, 186, 189

[56] References Cited

U.S. PATENT DOCUMENTS

| | | | |
|---|---|---|---|
| 190,553 | 5/1877 | Church | 126/283 |
| 564,382 | 7/1896 | Larson | 126/283 |
| 660,290 | 10/1900 | Corbin | 211/175 X |
| 1,562,089 | 11/1925 | Holley | 280/47.35 X |
| 1,620,313 | 3/1927 | Abele | 211/186 X |
| 1,691,571 | 11/1928 | Haven | 280/47.26 X |
| 1,793,637 | 2/1931 | Rockwell | 280/47.26 |
| 1,828,248 | 10/1931 | Hallowell et al. | 280/47.24 |
| 1,915,173 | 6/1933 | Vieregge | 280/79.2 |
| 2,181,892 | 12/1939 | Head | 280/47.18 |
| 2,764,971 | 10/1956 | Hostetter | 126/298 |
| 2,782,047 | 2/1957 | Moran | 280/654 |
| 2,817,436 | 12/1957 | Simpson | 280/47.24 X |
| 3,172,376 | 3/1965 | Havlis | 211/186 X |
| 3,202,438 | 8/1965 | Panknin et al. | 280/42 |
| 3,218,090 | 11/1965 | Herman | 280/47.26 |
| 3,255,905 | 6/1966 | Cochran | 280/47.26 |
| 3,341,028 | 9/1967 | Nichols | 211/182 X |
| 3,741,413 | 6/1973 | Friel | 280/47.17 X |
| 3,894,753 | 7/1975 | Ickes | 280/47.34 |

FOREIGN PATENT DOCUMENTS 26023   7/1915   Norway .............................. 126/283

Primary Examiner—Joseph F. Peters, Jr.
Assistant Examiner—Milton L. Smith
Attorney, Agent, or Firm—Seidel, Gonda, Goldhammer & Panitch

[57] ABSTRACT

A rack and carrier for stacking and transporting firewood for both commercial and residential use which is capable of standing freely in a rigid manner when fully assembled and being collapsable for easy storage in a narrow or flat space. The rack is constructed from a pair of upright side frame members which are held in rigid spaced relation by three brackets attached at the bottom, midway and the top of the frame members by certain attachment means. The rack when constructed for residential use can be moved using handles attached to the top portions of the frame members, such handles can be fixed, pivotable or removable, and a pair of wheels attached to the bottom of the frame members. The rack when constructed for commercial use rests on a set of legs which provide sufficient clearance for the tines of a lift truck and can be moved by such lift truck or an overhead crane which can hook into the bottom opening of each of the set of upper attachment means. The rack of either construction is collapsable for storage upon the removal of the brackets.

10 Claims, 6 Drawing Figures

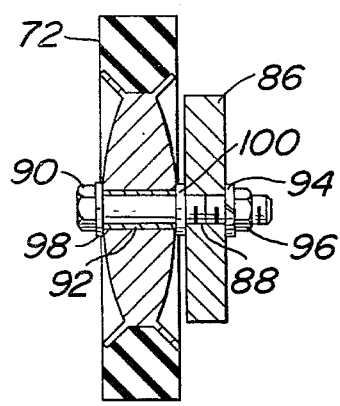
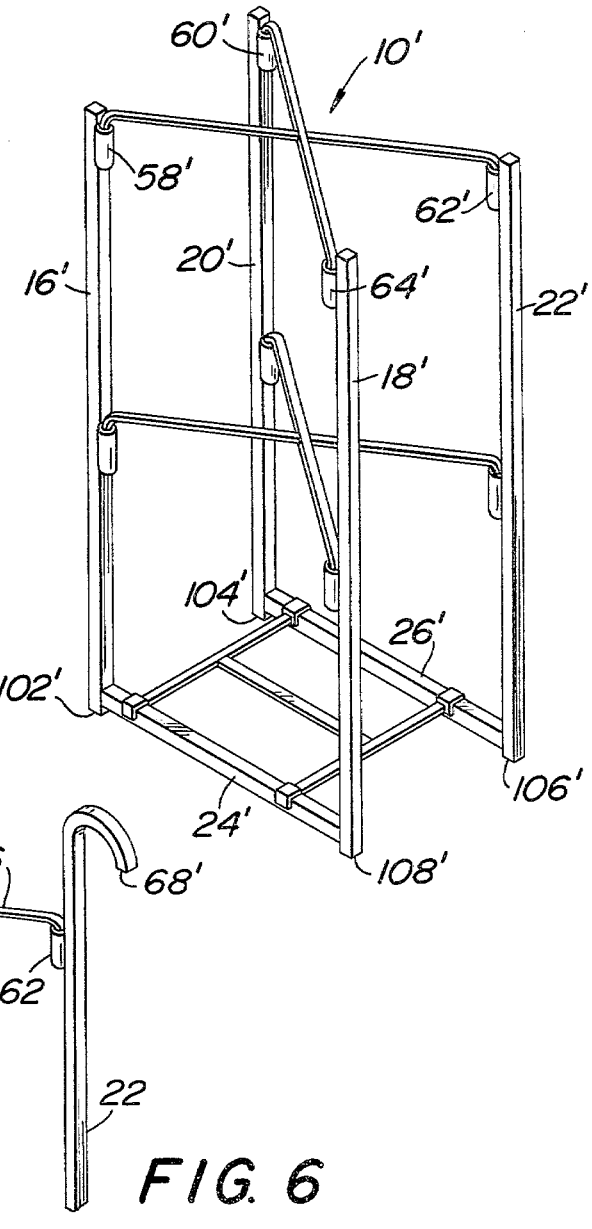
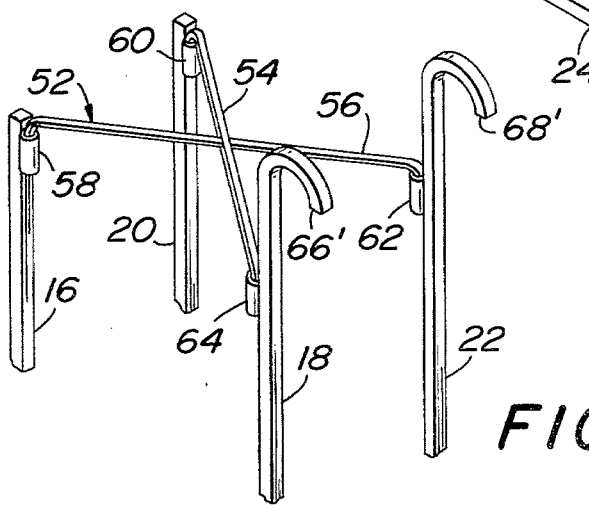

FIREWOOD RACK AND CARRIER

BACKGROUND OF THE DISCLOSURE

For the most part, wood, especially firewood, has always been carried in bulk. The wood would be cut and loaded one piece at a time by hand on a vehicle for transportation to a place of storage. On arrival the wood would be unloaded again by hand, piece by piece, and stacked for storage. For delivery to a customer the wood would again be loaded by hand on a vehicle for delivery to the customers home or place of business. On arrival at the delivery point the wood must again be unloaded by hand and then restacked for storage prior to use.

There are some devices which have eased the burden for the consumer in bringing the wood from its place of storage to the fireplace. These devices include wheeled hand carts which are capable of handling only a small number of logs. There are also numerous wood carrying bags and buckets which are available for home use. There are no such carriers available to a commercial supplier of firewood which could also be adaptable for home use.

SUMMARY OF THE INVENTION

This invention relates to a firewood rack and carrier which holds approximately ⅛th cord of firewood. The rack is so constructed that when assembled it is entirely rigid so that it may either be wheeled about by the use of handles or loaded and unloaded from vehicles by using an overhead crane or a lift truck. The rack, if mounted on wheels, can be easily moved from place to place by one person. The rack is used for stacking, transporting and storing firewood. When not in use the rack can be easily collapsed and stored in a minimal amount of space.

It is constructed of a pair of U-shaped side frame members which open upward for holding the firewood. A first bracket which is removeably attachable to the bottom portions of the U-shaped side frame holds the bottom portions of the frames in fixed spaced relation and provides a support for a first stack of firewood. A means for attaching two other brackets to the vertical portions of the frames, for example tubes or pipes, are welded to each of the vertical portions at a point one-half the distance between the horizontal bottom portions and the top of each vertical portion and adjacent the top of each vertical portion. A second bracket which is removeably attachable to the set of tubes at the points intermediate the ends of the vertical portions holds each vertical portion of each frame in fixed spaced relation to each other creating a lower compartment for the first stack of firewood therebelow and provides support for a second stack of firewood thereabove. A third bracket which is also removeably attachable to the set of tubes adjacent the top of each vertical portion holds each vertical portion of each frame in fixed spaced relation to each other creating an upper compartment for the second stack of firewood therebelow. The rack can be equipped with wheels attached adjacent to the bottom portions of two adjoining vertical portions of the U-shaped frames. The rack can have handles attached adjacent the top of two adjoining vertical portions of the U-shaped frames which can be fixed, entirely removeable or pivotable about the vertical portions.

It is an object of the present invention to provide a firewood rack and carrier for the commercial firewood supplier which is usable to stack and store wood from the time it is cut and first stacked through and including the time the rack and carrier is returned from the consumer in an empty state.

It is a further object of the present invention to provide a firewood rack and carrier that is easily transported and stored in that it takes a minimum amount of floor space and is further capable of being moved by a single person even when fully loaded.

It is a further object of the present invention to provide a firewood rack and carrier that is totally collapsable when unloaded in order to be stored or transported in a minimal amount of space.

Other objects of the present invention will appear hereinafter.

For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 4 is an enlarged view along the line 4—4 in FIG. 1;

FIG. 5 is a perspective view of the firewood rack and carrier of the present invention without wheels or handles;

FIG. 6 is a perspective view of the upper portion of the present invention with rigid handles.

DETAILED DESCRIPTION OF THE INVENTION

Figure 1:
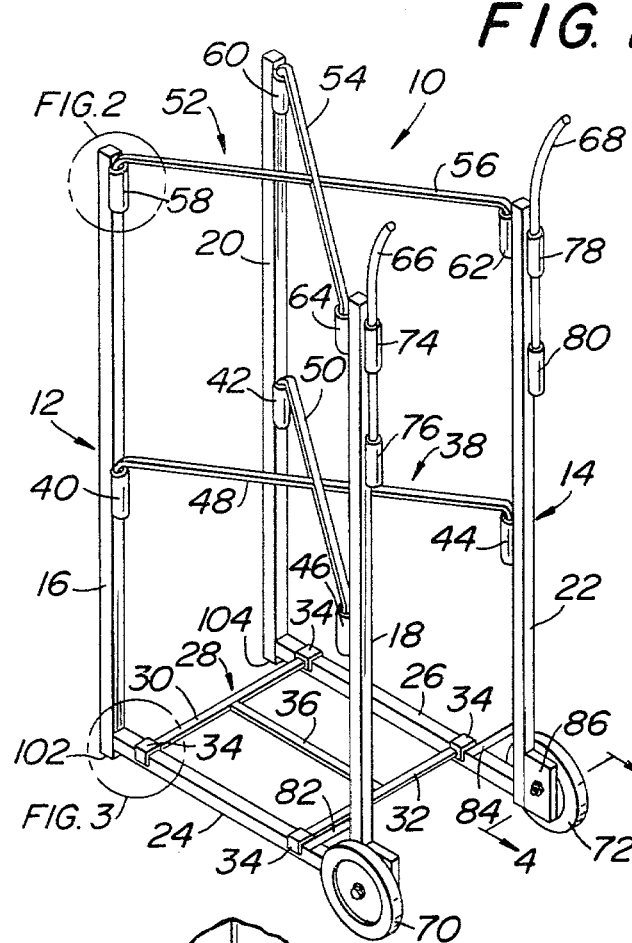
FIG. 1 is a perspective view of the firewood rack and carrier of the present invention with attached wheels and handles.

The present invention is best understood by referring to the drawings wherein like numerals indicate like elements. Referring to FIG. 1, the firewood rack and carrier 10 of the present invention is shown here empty. The rack 10 is generally comprised of two U-shaped members or frames 12, 14. Each of the U-shaped members 12, 14 is composed of vertical rods 16, 18, 20 and 22. Vertical rods 16 and 18 are joined together by welding a connective rod 24 adjacent their bottoms. Rods 20 and 22 are similarly joined together adjacent their bottoms by connecting rod 26.

Holding the two U-shaped members 12, 14 together is an H-shaped bracket 28. The bracket 28 consists of two rods 30, 32 having squared-off inverted U-shaped connectors 34 on each of their ends. Each rod 30, 32 is welded at its center to connecting rod 36 to complete the H configuration.

Figure 3:
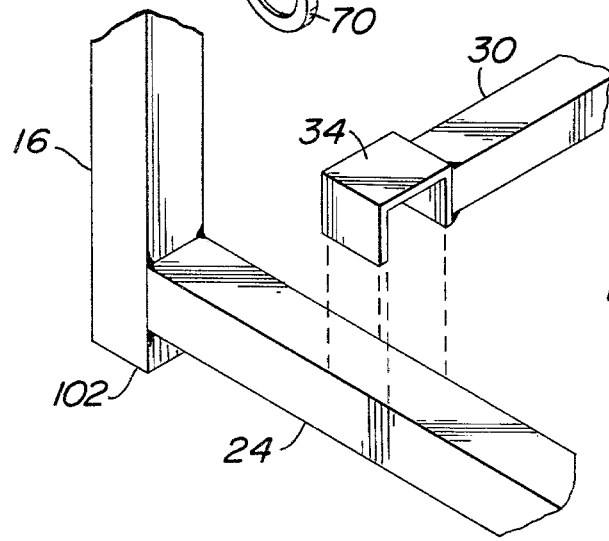
FIG. 3 is an enlarged exploded view of the circled area so designated in FIG. 1.

Referring to FIG. 3, the connector 34 closely fits over rod 24 of U-shaped member 12. Each connector 34 similarly fits over one of the two horizontal rods 24, 26. Attaching the bracket 28 to the two U-shaped members 12, 14 provides sufficient support to hold the two U-shaped members 12, 14 in a substantially equally distant relationship along the entire length of rods 24, 26. The bracket 28 also provides support for the firewood which is placed in the rack in a position transverse to the direction of rods 24, 26.

Figure 2:
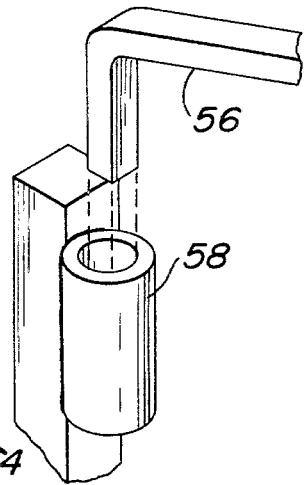
FIG. 2 is an enlarged exploded view of the circled area so designated in FIG. 1.

When the firewood is stacked to a height approximately equal to half the height of the rack 10, a second support bracket 38 is placed on the rack. At the center of each of the vertical rods 16–22 of the U-shaped members 12, 14 open-ended tubes 40, 42, 44 and 46 are welded or similarly attached to the inward facing surface of each of the vertical rods. Inserted in these tubes 40–44 is the bracket 38. The bracket 38 is composed of two rods 48, 50 welded at their centers. The ends of each of the rods 48, 50 are bent at 90° angles so as to fit into the tubes 40–44 in a downward direction. The upper bracket 52 is similar in construction to the lower bracket 38. It has two rods 54, 56 welded at their centers with each of their ends bent at a 90° angle. The bracket 52 is placed in identical open-ended tubes 58, 60, 62 and 64. Each of these tubes 58–64 is welded or similarly attached to the inner surface of each of the vertical rods 16–22 immediately adjacent their tops. See FIG. 2.

Since all of the tubes 40–46 and 58–64 and the ends of the brackets 38 and 52 are identical only one such connection will be described herein with the understanding that all such ends fit into each tube in a similar manner.

The cross rod 56 fits into the open upper end of tube 58. The diagonal measurement across the end of rod 56 is just slightly smaller than the inside diameter of the hole in the top of tube 58 so that rod 56 fits tightly into tube 58. The tube 58 is shown having a round end configuration but it could just as easily have a matching square hole to mate exactly with the end of rod 56. The exterior of the tube can also be square so as to match the internal hole or any combination of the square or round configurations can be used to mate with the rod. The rods 48, 50, 54 and 56 may also have varied outside configurations, e.g. round, rectangular, as long as they are able to mate tightly with the tubes 40–44, 58–64. It is preferred, however, that the rods 48, 50, 54 and 56 are square in cross-section to provide a more rigid bracket.

The rack 10 can be moved about by one person by grasping the handles 66, 68 and pivoting the rack 10 backwards on its wheels 70, 72. The rack is then moveable by a single person even when fully loaded.

The handles 66, 68 are attached to any two adjacent vertical rods such as 18, 22. The handles 66, 68 are attached to the rods 18, 22 by means of handle guides 74, 76, 78 and 80. These guides are similar to the bracket attachment tubes and are mounted on the rods 18, 22 by welding. In order that the handles 66, 68 remain at a uniform height the lower handle guides 76, 80 are sealed at the bottom to prevent the handles 66, 68 from going through the guides resulting in non-uniform height of the handles. The handles 66, 68 as mounted are entirely removeable from the guides 74–80 or can be folded in any direction to provide for closer stacking of the racks 10 either for storage or transportation on a vehicle.

Referring to FIG. 6, an alternative type of handle is shown. The handles 66', 68' are rigid arcuate extensions of the vertical rods 18, 22 extending outward from the rack 10. These rigid handles 66', 68' are sufficiently above the top of the rack 10 so as not to interfere with the stacking of the racks for storage or transportation.

The wheels 70, 72 are mounted on adjacent vertical rods such as rods 18, 22. The wheels 70, 72 are preferably made from solid rubber. Wheel brace supports 82, 84 serve a two-fold purpose. They provide added support between the horizontal rods 24, 26 and the vertical rods 18, 22. The supports 82, 84 also prevent the loaded firewood from interfering with the rotation of the wheels 70, 72 by maintaining the firewood in a portion outside the circle of the wheels. The supports 82, 84 can be either welded or bolted to the rods.

The mounting structure for wheel 72 is identical to that of wheel 70 and, therefore, only the structure associated with wheel 72 will be described. Referring to FIG. 4, a mounting bracket 86 is welded or attached in a similar fashion to the vertical rod 22. The mounting bracket 86 can be either square or rectangular in shape and extends outward from the rack 10. There is a hole 88 preferably in the center of bracket 86 through which bolt 90 passes. Bolt 90 is configured so that its outer surface nearer its head is smooth with threads extending from its other end not more than half way up its shaft. This is to allow for the rotation of the wheel 72 about the smooth upper shaft portion of the bolt 90. The wheel 72 is mounted on bracket 86 by inserting bolt 90 through the wheel mount guide 92 in wheel 90 and through the hole 88 in bracket 86. The bolt 90 is secured to the bracket 86 by means of a split-ring lock washer 94 and nut 96. The wheel 92 is able to freely rotate because the wheel mount guide 92 has spacer rings 98, 100 associated therewith. Each spacer ring 98, 100 maintains the body of the wheel 72 from contacting any other surface which would retard the rotation of the wheel. Ring 98 separates the wheel 72 from the head of the bolt 90. Ring 100 separates the wheel 72 from the bracket 86. Thus, when the lock washer 94 and nut 96 are tightened down on the shaft of bolt 90 the spacer rings 98, 100 accept the force exerted on the wheel mount guide 92 to hold the wheel 72 securely in position. The wheel 72 is constructed so that it can rotate about the wheel mount guide 98 in any convenient fashion presently known for such rotation such as the use of bearings or the like. In this manner the wheel 72 is free to rotate about the mounting bolt 90 facilitating the easy movement of the rack 10 from one place to another.

A person wanting to move the rack, whether loaded or empty, tilts the rack 10 in the direction of the handles 66, 68, by using such handles until the vertical rods 16, 20 are off the ground and the weight of the rack is balanced on the wheels 70, 72. Then the person either pushes or pulls the rack 10 rolling it along on its wheels 70, 72, to a new position and then lowers rack 10 back on to the rods 16, 20. The bottom portions of rods 16, 20, the feet 102, 104, are of sufficient length to keep the rack 10 in horizontal equilibrium when the wheels 70, 72 are mounted on the other side of the rack.

The firewood rack and carrier is also useable in both home and commercial situations without handles 66, 68 or wheels 70, 72. As shown in FIG. 5, the rack 10' has neither wheels nor handles. This rack 10' is capable of being moved either by a lift truck or an overhead crane. The lift truck tines are able to fit under the horizontal rods 24', 26' and lift the rack 10' for transportation or movement to a different storage location. The feet 102', 104', 106' and 108' of each vertical rod are of sufficient height to allow for clearance of the tines. Additionally, the rack 10' can be moved by use of an overhead crane or the like by coupling hooks to the bottom openings of the tubes 58', 60', 62' and 64'. Thus, the rack 10' can be picked up and moved for either transportation or storage in a different location. Rack 10 can be also moved by a lift truck or crane in a similar manner to that described for rack 10'.

The firewood rack and carrier of the present invention provides for universal adaptation of the rack to both commercial and home uses. The rack is capable of being moved by using industrial or commercial type lifting or transporting devices such as a lift truck or an overhead crane and also is capable of movement by a single person through use of its handles and wheels. The rack when used with the handles and wheels easily enables a person to move the rack from one location to another whether the rack is used for commercial purposes or home use. The firewood rack and carrier of this disclosure further provides for a rack which is collapsible for flat storage against a wall or other similar place.

The present invention may be embodied in other specific forms without departing from the spirit or essential attributes thereof and, accordingly, references should be made to the appended claims, rather than to the foregoing specification as indicating the scope of the invention.

I claim:

1. A rigid rack for stacking and supporting firewood comprising:

a pair of upright side frame members for holding firewood therebetween, each frame member having a pair of legs extending upwardly from opposite ends of a bight portion;

a first bracket means having open spaces, said first bracket means attached to the bight portions of said frame members for holding said bight portions in fixed spaced relation and providing a horizontal support for a first stack of firewood;

a second bracket means having open spaces and comprised of at least two elements, said second bracket means being attached to said frame members between the ends of said frame members for holding each leg of each frame member in fixed spaced relation to each other thereby defining an upper limit for a lower compartment for said first stack of firewood therebelow and providing a horizontal support for a second stack of firewood thereabove; and a third bracket means having open spaces and comprised of at least two elements, said third bracket means being attached to said frame members adjacent the upper ends of said frame members for interconnecting and holding each leg of each frame member in fixed spaced relation to each other thereby defining an upper limit for an upper compartment for the second stack of firewood therebelow.

2. A collapsable rack for stacking and supporting firewood comprising:

a pair of upright side frame members opening upward for holding firewood therebetween, each frame member having a pair of legs extending upward from opposite ends of a bight portion;

a first bracket means having open spaces, said first bracket means removably attached to the bight portions of said frame members for holding said bight portions in fixed spaced relation and providing a horizontal support for a first stack of firewood;

a second bracket means having open spaces and comprised of at least two elements, said second bracket means being removably attached to said frame members between the ends of said frame members for holding each leg of each frame member in fixed spaced relation to each other thereby defining an upper limit for a lower compartment for said first stack of firewood therebelow and providing a horizontal support for a second stack of firewood thereabove; and a third bracket means having open spaces and comprised of at least two elements, said third bracket means being removably attached to said frame members adjacent the upper ends of said frame members for interconnecting and holding said each leg of each frame member in fixed spaced relation to each other thereby defining an upper limit for an upper compartment for the second stack of firewood therebelow; and said rack being capable of standing freely in a rigid configuration and being collapsable for easy storage upon removal of each such bracket means.

3. A rack in accordance with claim 1 or 2 which further comprises first and second attachment means for attaching said second and third bracket means to said frame members wherein said first and second attachment means each includes a set of tubes mounted on said legs of said frame members for removably supporting said second and third bracket means.

4. A rack in accordance with claim 3 wherein said first bracket means is located approximately one-half the distance between said bight portions of said frame members and the upper ends of said frame members.

5. A rack in accordance with claim 3 wherein said set of tubes has an opening through the bottom thereof for coupling with a means for lifting and moving said rack from one position to another.

6. A rack in accordance with claim 1 or 2 wherein two adjoining legs of said frame members have handles attached adjacent the top thereof for guiding the movement of said rack.

7. A rack in accordance with claim 6 wherein said handles are removeable.

8. A rack in accordance with claim 6 wherein said handles are pivotable about said legs.

9. A rack in accordance with claim 1 or 2 wherein two adjoining legs of said frame members have wheels attached adjacent the bottom portions thereof for permitting movement of said rack from one position to another.

10. A rack in accordance with claim 1 or 2 wherein said first bracket means is H-shaped and said second and third bracket means are X-shaped.

* * * * *